Figure 1:
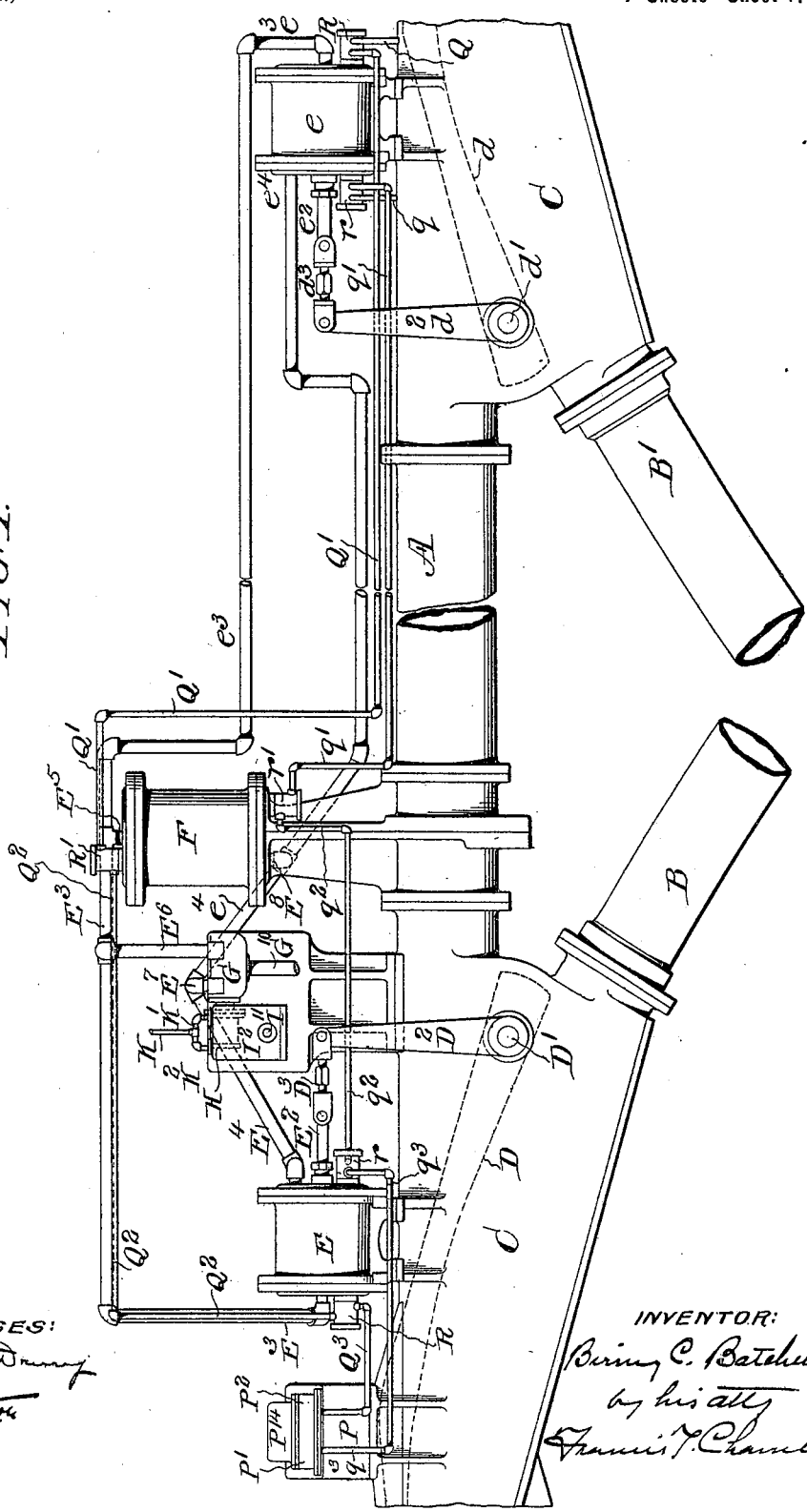

No. 623,969. Patented May 2, 1899.
B. C. BATCHELLER.
PNEUMATIC TRANSMISSION SYSTEM.
(Application filed Feb. 24, 1898.)

(No Model.) 7 Sheets—Sheet 1.

WITNESSES:

INVENTOR:

No. 623,969. Patented May 2, 1899.
B. C. BATCHELLER.
PNEUMATIC TRANSMISSION SYSTEM.
(Application filed Feb. 24, 1898.)
(No Model.) 7 Sheets—Sheet 2.
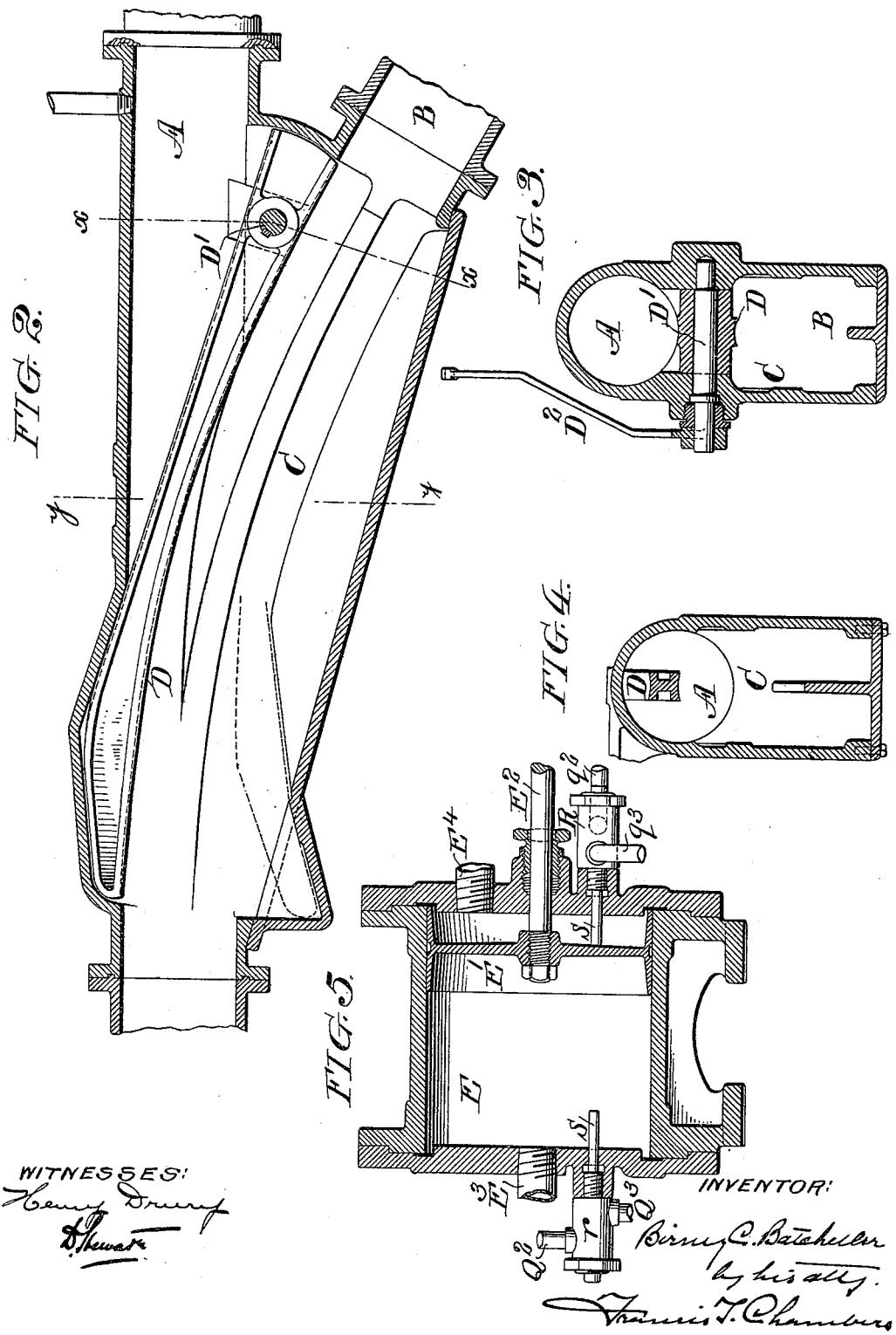
WITNESSES:
INVENTOR:

No. 623,969. Patented May 2, 1899.
B. C. BATCHELLER.
PNEUMATIC TRANSMISSION SYSTEM.
(Application filed Feb. 24, 1898.)
(No Model.) 7 Sheets—Sheet 3.
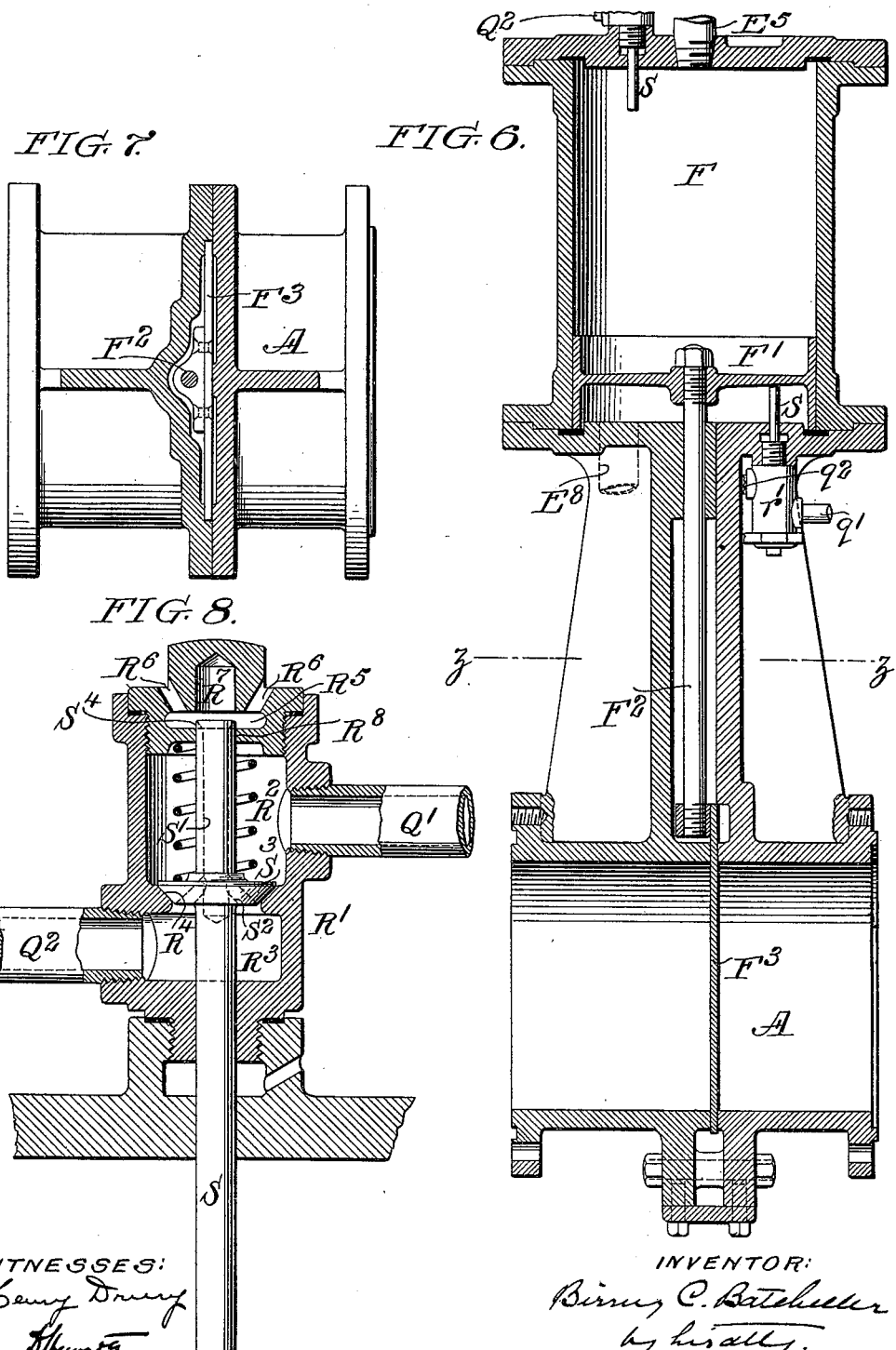
WITNESSES:
INVENTOR:

No. 623,969. Patented May 2, 1899.
B. C. BATCHELLER.
PNEUMATIC TRANSMISSION SYSTEM.
(Application filed Feb. 24, 1898.)

(No Model.) 7 Sheets—Sheet 4.

WITNESSES: INVENTOR:

No. 623,969. Patented May 2, 1899.
B. C. BATCHELLER.
PNEUMATIC TRANSMISSION SYSTEM.
(Application filed Feb. 24, 1898.)
(No Model.) 7 Sheets—Sheet 5.
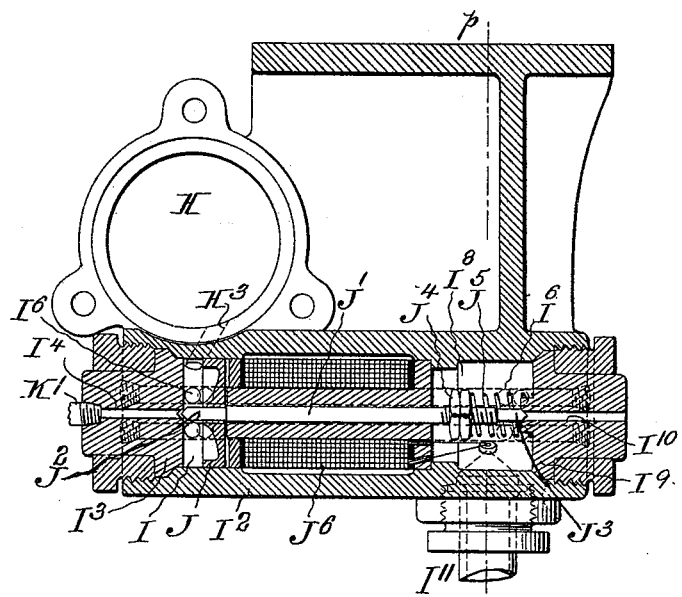
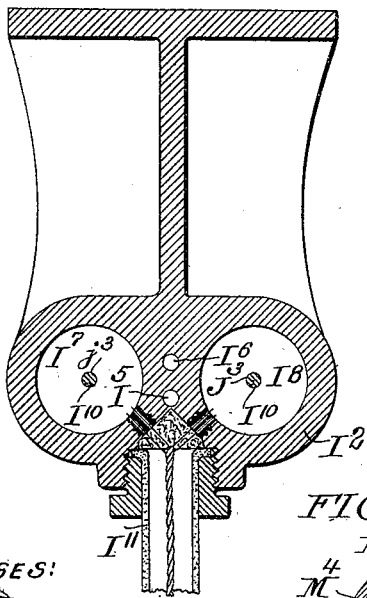
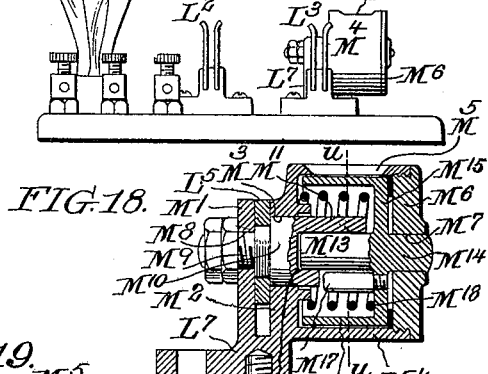
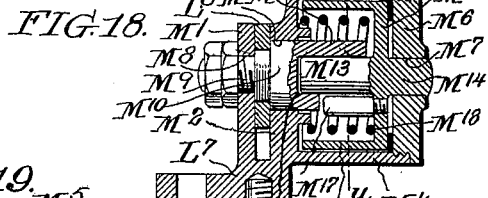
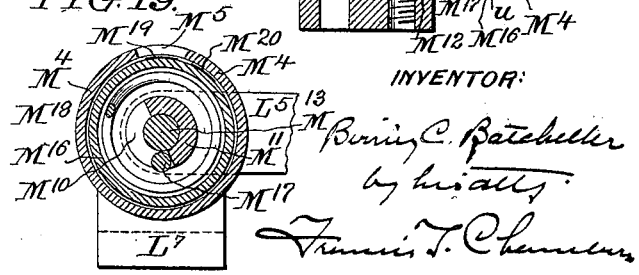

No. 623,969. Patented May 2, 1899.
B. C. BATCHELLER.
PNEUMATIC TRANSMISSION SYSTEM.
(Application filed Feb. 24, 1898.)
(No Model.) 7 Sheets—Sheet 6.
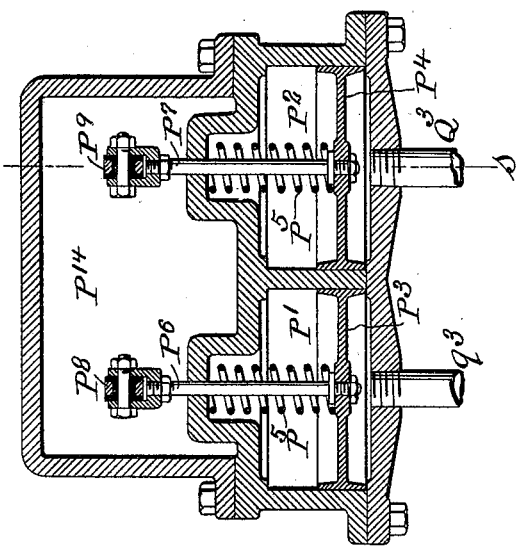
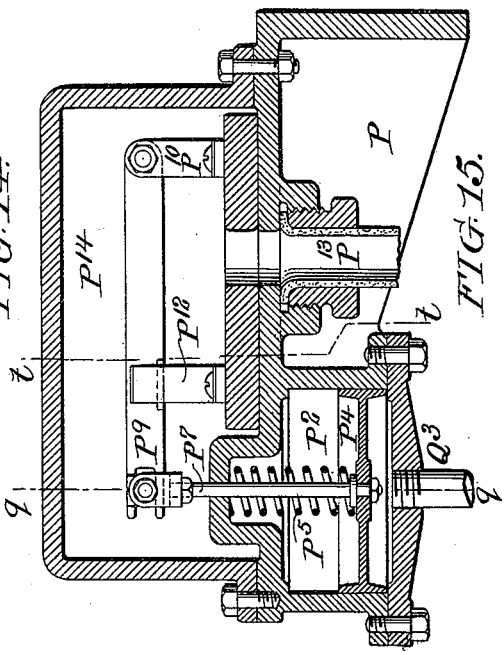
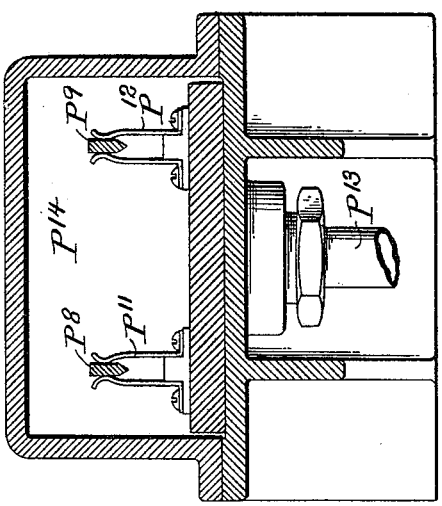
WITNESSES: INVENTOR:

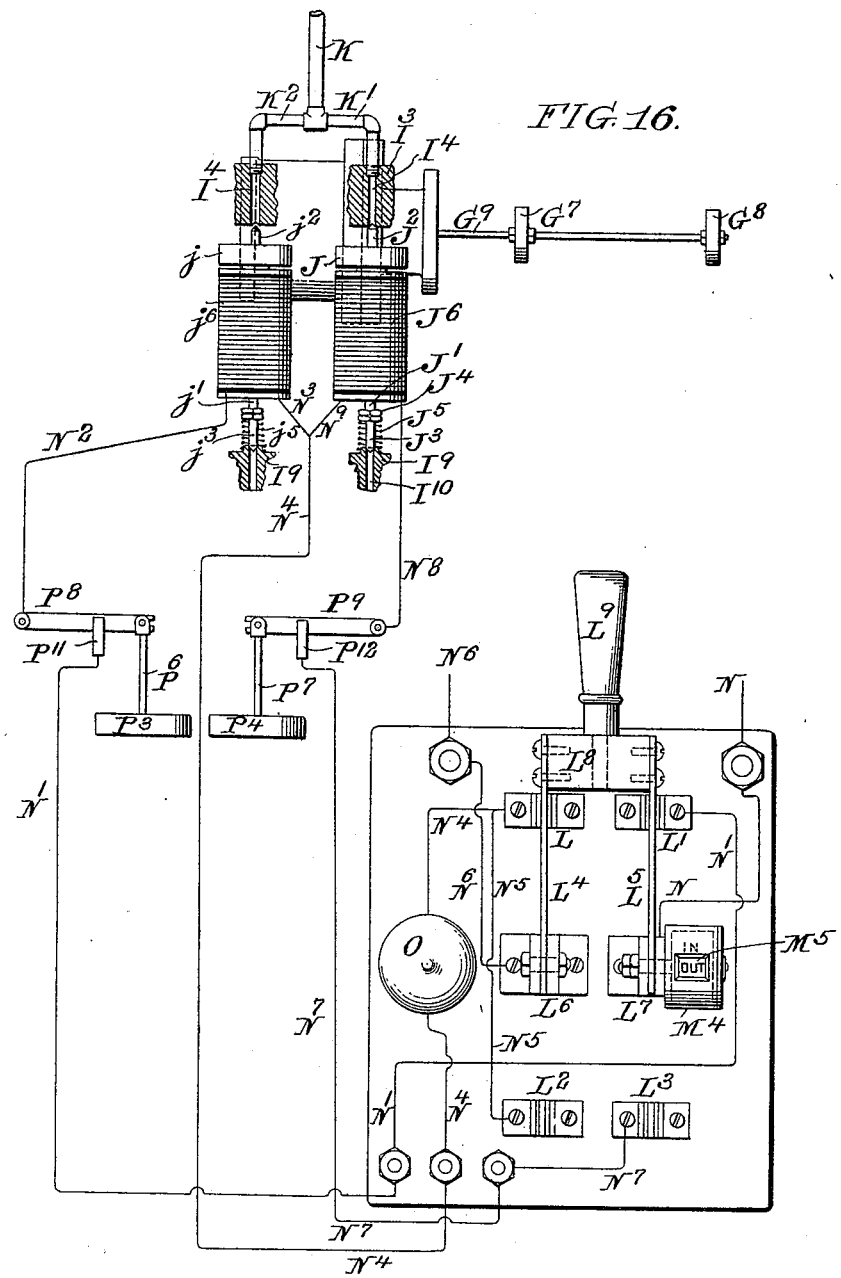

UNITED STATES PATENT OFFICE.

BIRNEY C. BATCHELLER, OF PHILADELPHIA, PENNSYLVANIA.

PNEUMATIC TRANSMISSION SYSTEM.

SPECIFICATION forming part of Letters Patent No. 623,969, dated May 2, 1899.

Application filed February 24, 1898. Serial No. 671,413. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Pneumatic Transmission Systems, of which the following is a true and exact description, reference being had to the accompanying drawings, which form a part thereof.

My invention relates to the construction of mechanism used in connection with and as a part of a pneumatic transmission system having for its object to provide improved means for actuating a system of switches, gates, or other devices controlling the passage of a carrier through the system, and also improvements in what may properly be called a "signal" system, by which an operator can determine whether or not the controlling devices have moved in accordance with his wishes, and in such a way as to place the system as a whole in the condition desired.

My invention can be applied with advantage in many different arrangements and modifications of the system, but is primarily designed in connection with a pneumatic-tube system having a loop branch and arranged with appropriate mechanism for throwing the said loop either into or out of the operative circuit of the system, and I have accordingly illustrated this application of my invention in the drawings, to which reference is now made, and in which—

Figure 9:
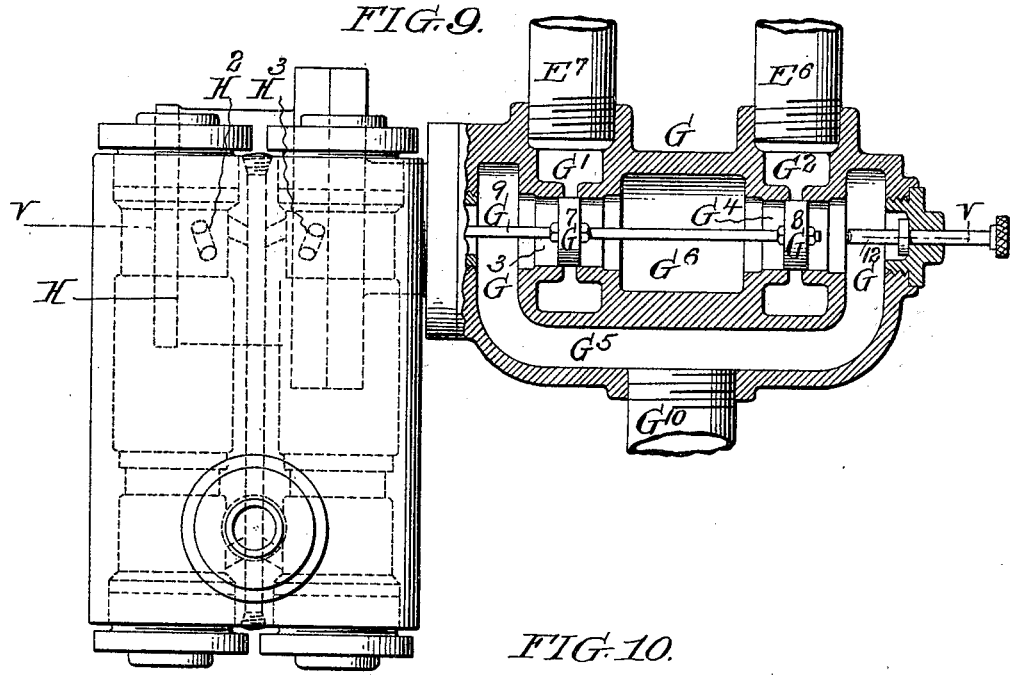
Figure 10:
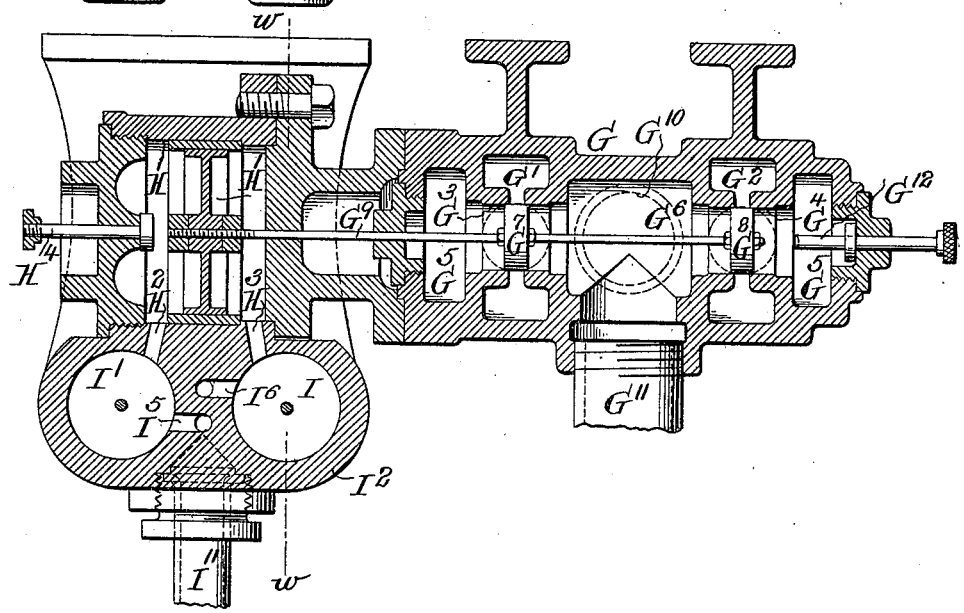

Figure 1 is a plan view illustrating in a condensed form the application of my improved mechanism to a transmission-tube system having a loop-circuit and for the purpose of throwing the said loop into and out of the main circuit, as may be desired. Fig. 2 is a sectional plan view through the junction of two tubes, showing the switch by which the path of the carrier at such junction is determined. Fig. 3 is a cross-section on the line $x\ x$ of Fig. 2. Fig. 4 is a cross-section on the line $y\ y$ of Fig. 2. Fig. 5 is a longitudinal section through one of the switch-controlling cylinders—as, for instance, the cylinder E in Fig. 1. Fig. 6 is a longitudinal section through the cylinder F controlling the gate in the main tube of the system, the section being extended to take in a portion of the main tube containing the gate. Fig. 7 is a cross-section on the line $z\ z$ of Fig. 6. Fig. 8 is a longitudinal section through one of the valve-casings, its valve, &c., used in connection with each cylinder of the system. Fig. 9 is a longitudinal section through the valve-casing and valve by which the motive fluid is directed to and exhausted from the various cylinders of the system, showing to the left a front elevation of the valve-actuating mechanism by which said valve is controlled. Fig. 10 is a cross-section on the line $v\ v$ of Fig. 9. Fig. 11 is a cross-section on the line $w\ w$ of Fig. 10. Fig. 12 is a cross-section on the line $p\ p$ of Fig. 11. Fig. 13 is a cross-sectional view, taken as on the line $q\ q$ of Fig. 14, through two cylinders sustained on the frame-casting P, and the function of which will be hereinafter described. Fig. 14 is a cross-section taken as on the line $s\ s$ of Fig. 13. Fig. 15 is a cross-section taken as on the line $t\ t$ of Fig. 14. Fig. 16 is a diagrammatic view illustrating the operation of the electric circuits and the switch controlling the same. Fig. 17 is a plan view of the switchboard and its appliances. Fig. 18 is an enlarged central sectional view of an indicator device connected with the switch; and Fig. 19 is a cross-section through said device, taken as on the line $u\ u$ of Fig. 18.

A, Fig. 1, indicates the main transmission-tube of the system, and B and B' the ends of a loop-tube connecting with the main transmission-tube at two different points through the medium of junction-boxes C C, such loop-tube, for instance, taking in an intermediate station or stations which at times it is desired to cut out of the system.

D and $d$ indicate, respectively, the switch indicated at each end of the loop-tube and by means of which a carrier coming through the main tube is deflected into the loop-tube and guided out thereof into the main tube again. These switches are, as shown, pivoted at D' and $d'$ and actuated by means of lever-arms D² and $d^2$, which, as shown, are connected by links D³ and $d^3$ with piston-rods E² and $e^2$, connected, respectively, with pistons, such as E', Fig. 5, in the cylinders E and $e$, each cylinder having, as shown in Fig. 5, tubes or passages, as indicated at E³ and E⁴, leading into each of its ends.

F, Figs. 1 and 6, is a cylinder similar to E and e, the piston F' moving in which connects, by means of its piston-rod F$^2$, with the gate F$^3$, arranged to open and close that portion of the tube A which lies between the junction-boxes C C, the plan, as shown in the drawings, being to close said gate when the switches D and d are in the position shown in Fig. 1 and in which the loop is intended to be in service and to open the main tube A when the position of the switches is changed to throw the loop out of service. The outer ends of the cylinders E and e and the upper end of the cylinder F are in the plan shown connected with a supply-pipe E$^6$ by means of a pipe E$^3$, leading to the outer end of the cylinder E, and a connecting-pipe E$^5$, leading to the upper end of the cylinder F and through an extension e$^3$ to the outer end of the cylinder e. The inner ends of the cylinders E and e and the lower end of the cylinder F are in turn connected with a supply-pipe E$^7$ by means of a pipe E$^4$, leading to the inner end of the cylinder E, and a pipe e$^4$, leading to the inner end of the cylinder e and having a branch E$^8$, leading to the lower end of the cylinder F.

The supply-pipes E$^6$ and E$^7$ lead into a valve-casing G, (see Figs. 1, 9, and 10,) said casing embracing chambers G' and G$^2$, into which the respective supply-pipes lead, a chamber G$^5$, connected with an exhaust-conduit, as pipe G$^{10}$, and a chamber G$^6$, connecting with a source of fluid-pressure—as, for instance, G$^{11}$—which may conveniently lead to the conduit-tube A, or, if desired, to any other source of pressure. The casing is adapted for use in connection with a valve—as, for instance, the double-piston valve G$^7$ G$^8$, moving in cylindrical portions G$^3$ and G$^4$, which portions are, as shown, in communication with the various chambers of the casing and so arranged that the motion of the valves will alternately connect each supply-pipe with a source of fluid-pressure and with the exhaust-chamber.

G$^9$ is a common valve-stem by which the valves are connected, and G$^{12}$ an adjustable stop to regulate the motion of the valve in one direction.

It will be obvious that the shifting of the valves G$^7$ and G$^8$ will alternately direct the pressure fluid through one of the supply-pipes to the various cylinders of the system and at the same time connect the other supply-pipe with the exhaust, thus enabling each piston to move in its cylinder and effecting simultaneously, or substantially so, the movement of each of the switches, the gate, or other device by which the motion of a carrier in the system is controlled. Such valve is therefore a controlling-valve for each of the individual separate parts of the system, and I will note here that while I prefer the construction involving the individual and separate cylinders and the use of pressure fluid governed by a controlling-valve to actuate them and through them the immediate controlling devices operating upon the carrier my invention in a broad sense is not dependent on the particular mechanism by which the controlling devices of the system are shifted and may be embodied in other substantially equivalent constructions in which the controlling devices are actuated by other mechanical means so long as said means are in turn operative by a common controlling device having the function and substantially the mode of operation of the valves G$^7$ G$^8$.

My preferred means for operating the controlling-valve of the system are those indicated in Figs. 10, 11, and 12, valve-stem G$^9$ being connected with a piston H', moving in a cylinder H, H$^2$ and H$^3$ being ports leading into the opposite ends of said cylinders from chambers I' and I and H$^4$ being an adjustable stop device for regulating the motion of the piston in one direction and, in the plan shown, for also regulating the motion of the controlling-valve. The chambers I and I' are, as shown, of cylindrical section and formed in a casting I$^2$, the upper part of each of said chambers being closed by a plug I$^3$, through which is formed a passage or channel I$^4$, leading into the top of the respective chambers and connected by branch pipes K' and K$^2$ (see Fig. 16) with a pipe K, leading to a source of fluid-pressure, which may be the tubes of the system or any other desired source.

J is a device serving the double purpose of a magnetic armature and a piston, moving in the cylinder I and centrally connected with a rod J', which has at its upper end a valve J$^2$, adapted to close the port I$^4$, and at its lower end a valve J$^3$, adapted to close the port I$^{10}$, which is the exhaust-port of the chamber I and connected therewith, as will be hereinafter described. As shown, I arrange an electromagnetic coil J$^6$ around the rod J' and in position to act upon the armature J, and in the same casting I$^2$, I form below the electromagnets the chambers I$^8$ and I$^7$, from which lead the exhaust-ports I$^{10}$ I$^{10}$, and which chambers are respectively connected with the chambers I and I' by means of the channels I$^5$ and I$^6$.

J$^4$ indicates adjusting-nuts screwing on the lower parts of the rod J' and serving as abutments for the spring J$^5$, the function of which is to normally thrust the rod J' upward, so as to force the valve J$^2$ to seat itself on the admission-port and at the same time to lift the valve J$^3$, opening the corresponding exhaust I$^{10}$.

I$^9$ are plugs closing the chambers I$^7$ and I$^8$ and in which are formed the exhaust-ports I$^{10}$, and I$^{11}$ is a tube through which the circuit-wires are introduced and lead to the magnets J$^6$ j$^6$.

The operation of the above-described actuating mechanism is as follows: The admission-ports I$^4$ I$^4$ are normally closed by the valves J$^2$ and j$^2$, owing to the upward pressure of the springs J$^5$ and j$^5$. Consequently the exhaust-ports I$^{10}$ I$^{10}$ leading from both chambers are normally open and no pressure exists in either chambers or at either end of the cylinders H, with which the chambers are connected. When one of the electromagnets $J^6$ or $j^6$ is energized, its corresponding armature J or $j$ is attracted, and owing to its connection with the spindle or rod $J'$ or $j'$, as the case may be, opens the admission-valve and simultaneously closes the exhaust-port, from which said chamber the pressure fluid from K then flows through the open admission-port and the chamber into which it opens and through such chamber into the ports $H^2$ and $H^3$, as the case may be, into one end of the cylinder H, the other end being freely connected with the open exhaust leading from the other chamber. The fluid, if any, can escape therefrom and the piston $H'$ is moved with a corresponding motion of its connected controlling-valve. It is of course contemplated that the electromagnets $J^6$ and $j^6$ shall be alternately and not simultaneously actuated, and obviously, as will be understood from the description above given, the alternate energizing of the electromagnets will accomplish a reciprocation of the piston $H'$ and the controlling-valve.

The special arrangements of electromagnets, valves, &c., hereinabove described embodies certain features which I believe to be novel and valuable, but is obviously capable of very material modification, and so far as my broad claims not specifically referring to the particular mechanism of this part of my apparatus are concerned I do not wish to be understood as making this particular construction an essential part of my invention.

The mechanism for alternately energizing the electromagnets $J^6$ and $j^6$, and which also is designed to perform other functions to be hereinafter described, is illustrated in Fig. 16 of the drawings and in some of its details in Figs. 17, 18, and 19. In these figures L and $L'$ indicate two contact-springs secured to a switchboard, and $L^2$ and $L^3$ two other contact-springs also secured to the board, $L^4$ and $L^5$ being switch-arms pivoted at $L^6$ and $L^7$ to the board and joined at their free ends by a non-conducting junction $L^8$, to which is attached a handle $L^9$, the arrangement being such that in one position of the switch the arms $L^4$ and $L^5$ are in contact, respectively, with the switch-springs L and $L'$, while in the other position they are in contact, respectively, with the switch-springs $L^2$ and $L^3$. As shown, the pivotal support $L^7$ of the arm $L^5$ is constructed, as shown in Figs. 18 and 19, with a slot formed between portions $M'$ and $M^2$ of the support in which the switch-arm is received, and a cylindrical extension $M^4$, formed with a slot-like opening $M^5$ at its top and closed, as shown, by a head $M^6$, having at its center a bearing $M^7$, an enlarged bearing $M^3$ being provided at the center of the opposite end of the cylinder and another bearing $M^8$ being provided in the arm $M'$, as shown. The switch-arm $L^5$ is, as shown, secured on a portion $M^9$ of a stud, which passes through the bearing $M^8$ and is secured on the outside thereof, as by nuts, while on the other side it has, first, an enlarged cylindrical section $M^{10}$, fitting in the bearing $M^3$, and beyond this a segmental extension, which, as shown, is about semicylindrical and indicated at $M^{11}$, a bearing $M^{12}$ being formed in this piece, as shown, to receive the end $M^{13}$ of a shaft or stud, the other end $M^{14}$ of which is held in the bearing $M^7$ and upon which is formed or to which is attached, by means of a web $M^{15}$, a cylindrical or segmental portion $M^{16}$, upon the periphery of which may be conveniently placed the words "In" and "Out," as shown in Fig. 16. $M^{17}$ is a pin secured to the web $M^{15}$, as shown, and adapted to be engaged by the respective ends of the segment $M^{11}$ as such segment is turned with a switch-arm. $M^{18}$ is a spring situated, as shown, in the cylindrical shell $M^{16}$ and having for its function simply to hold the parts together with sufficient friction to prevent their adventitious movement.

The operation of the above-described device can be readily followed. The switch-arm being in the position, for instance, shown in Fig. 16, the word "Out" is brought to register with slotted opening $M^5$. The switch-arm being now turned downward, the word "Out" will remain exhibited until the motion of the segment $M^{11}$ has amounted to nearly a semicircular movement, whereupon the end or the edge of the segment will come in contact with the pin $M^{17}$ and move it and the cylindrical shell $M^{16}$ into position to exhibit the word "In" at the slot $M^5$, this change in the signal occurring only when the switch-arms make contact with the springs $L^2$ and $L^3$.

The circuit-wiring exhibited in Fig. 16 may be described as follows: N is a wire leading from a battery (not shown) and connecting with a pivotal support $L^7$, which of course must be an insulated conductor, and from which the current passes to the switch-arm $L^5$. Thence in the position of the switch shown it passes to the spring $L'$, and thence through the line-wire $N'$, through a switch contact and lever $P^{11}$ $P^8$, to be hereinafter described, to the line-wire $N^2$, connected with one end of the windings on the electromagnet $j^6$, the other end of the windings connecting by the line-wire $N^3$ with wire $N^4$, which leads to and through a signal O, which may conveniently be a lamp, to the spring-contact L, through which the current passes to the switch-arm $L^4$, through the insulated pivoted support $L^6$ to the line-wire $N^6$, which leads to the other pole of the battery. (Not shown.) When the switch-arm is thrown to the alternate position, the current passes from the switch-arm $L^5$ to the spring-contact $L^3$, thence through the wire $N^7$ and the spring and switch-lever $P^{12}$ and $P^9$ to the wire $N^8$, connected with one end of the windings to the electromagnet $J^6$, the other end of which windings connects by the wire $N^9$ with the wire $N^4$, the current passing through said wire and the signal O, as before, and through the branch connection $N^5$ to the spring-contact $L^2$, thence through the switch-arm $L^4$ and line-wire $N^6$ to the opposite pole of the battery, as before. It will be seen that by the circuit-windings described the shifting of the switch lever or levers alternately energizes the two electromagnets with the results already described upon the controlling-valve of the system, and it will also be obvious that the "In" and "Out" signal described particularly in connection with Figs. 18 and 19 is not an essential or even important means of indicating the position of the switch where, as in the plan shown, the switch-lever is changed in position, because such change in position would be a quite sufficient indication of the intended shifting of the controlling-valve and of the parts controlled thereby. In cases, however, where the switching device is not actually changed in apparent position an indicating device other than the position of the switch has obvious value. It will also be observed that in the system of wiring or circuits described the signal O, whether it be a lamp or other device actuated by the current, is similarly actuated, no matter through which electromagnet the current passes, because it is situated in a common return-wire.

In the particular arrangement illustrated in the drawings the safety-signal after each manipulation of the switch or other device regulating the position of the controlling valve or mechanism is given by the extinguishment of the lamp O; but whether this particular signal or another is used, an important feature of my invention is the provision in connection with the various independent actuating devices operating upon the switches, gates, &c., of the system of means operated and dependent for operation upon the designed movement of each of the governing devices, and so arranged in connection with a signal as to actuate it only upon the completion of the designed movement of each part of the system. My preferred mechanism for effecting this is that illustrated in the drawings and in which each actuating-cylinder is provided with two valve-casings—such as $R$ $r$, illustrated in connection with the cylinders E and $e$, and $R'$ $r'$, illustrated in connection with the cylinder F, the detailed construction of these valve-casings and the valves operating in connection therewith being that illustrated in Fig. 8 of the drawings, the casing being divided, as shown, into two main chambers $R^2$ and $R^3$, between which is situated the valve-seat $R^4$. An additional chamber $R^5$ is provided above the chamber $R^2$, leading into the atmosphere through channels $R^6$ and having at its top a cylindrical extension $R^7$. Conduits, as $Q'$ and $Q^2$, Fig. 8, lead into the chambers $R^2$ and $R^3$, respectively, and preferably one of these casings is secured to each head of the cylinder, as indicated in Figs. 1, 5, and 6.

S is a valve-stem, the upper end of which is made hollow, as indicated at $S'$. A valve $S^3$ is secured to the stem and arranged to operate in connection with the seat $R^4$, apertures $S^2$ extending through or below the valve from the hollow portion $S'$ of the stem into the chamber $R^3$. The solid end of the valve-stem extends through the head of the cylinder, to which it is attached, as shown, in position to be moved by the piston working in the cylinder as it approaches the end of its stroke. The outer or hollow end of the valve-stem passes through the wall separating the chambers $R^2$ and $R^5$, making a fit therewith, as indicated at $R^8$, and the construction is, as shown, such that when the valve $S^3$ is seated the chamber $R^3$ is in communication with the chamber $R^5$ through the hollow valve-stem, and thus in communication with the atmosphere through the passages $R^6$. When, however, the valve $S^3$ is raised from its seat, the hollow end of the valve-stem passes into the cylindrical portion $R^7$, closing connection between either the chambers $R^2$ or $R^3$ and the atmosphere. It will thus be seen that the hollow stem $S^4$ serves as a valve controlling the connection between chamber $R^3$ through chamber $R^5$ to the atmosphere.

Q and $q$ are supply-pipes leading from a source of fluid-pressure, as indicated, from the pipe A and connecting, respectively, with the chambers $R^2$ of the valve-casings R and $r$, attached to the opposite heads of the cylinder $e$. From the chamber $R^3$ of the casing R leads the conduit $Q'$, connecting again with the chamber $R^2$ of the casing $R'$, attached to the upper head of the cylinder F, and from the chamber $R^3$ of this casing the conduit $Q^2$ leads to the chamber $R^2$ of the casing R, attached to the outer head of the cylinder E, and from the chamber $R^3$ of this casing the conduit $Q^3$ leads into the lower end of the cylinder $P^2$. (See Figs. 13 and 14.) From the chamber $R^3$ of the casing $r$ the conduit $q'$ leads to the chamber $R^2$ of the casing $r'$, and from the chamber $R^3$ of this casing the conduit $q^2$ leads to the chamber $R^2$ of the casing $r$, attached to the inner head of the cylinder E and from the chamber $R^3$ of which the conduit $q^3$ leads to the lower end of the cylinder $P'$. (See Fig. 13.) The cylinders $P'$ and $P^2$ are formed in or secured to a bracket-casting P, having conveniently a box-like casing $P^{14}$ secured to its top, as shown in Figs. 13, 14, and 15. Pistons $P^3$ and $P^4$ are situated in the cylinders $P'$ and $P^2$ and held normally at the bottom of said cylinders by the action of springs $P^5$. The piston-rods $P^6$ and $P^7$ of the respective pistons are connected, as shown, with the free ends of pivoted switch-levers $P^8$ and $P^9$, pivoted at $P^{10}$ in the box-casing $P^{14}$ and arranged to make contact with the circuit-springs $P^{11}$ and $P^{12}$ when the pistons are in their depressed position and to break such contact when the pistons are forced upward.

$P^{13}$ indicates a conduit for the circuit-wires leading into the casing $P^{14}$.

The operation of the devices last described is as follows: The valves $S^3$ are normally held to their seats, as by a spring, such as indicated in Fig. 8, and in this position, as already described, the chambers $R^3$ of the various casings are in free communication with the atmosphere. In practice, however, this communication with the atmosphere or exhaust is determined entirely by the movement of the various controlling devices in the system, as shown by the position of the pistons in the actuating-cylinders. Thus when the controlling-valve is moved to place the supply-pipe $E^6$ in communication with a source of fluid-pressure the motive fluid flows to the outer ends of the cylinders E and $e$ and the upper end of the cylinder F, and with the result, if the parts move as indicated, that the switches D and $d$ are moved to the position shown in dotted lines in Fig. 1 and the gate controlled by the cylinder F closed. The piston in the cylinder $e$ at the end of its stroke comes in contact with the valve-stem S, working in the casing $r$, raising the valve $S^3$ from its seat and forcing the upper end of the piston-rod S into the cylinder $R^7$, cutting off the exhaust-passage and opening a free course for pressure fluid from the supply-pipe $q$ into the conduit-pipe $q'$, from which it flows into the chamber $R^2$ of the casing $r'$, attached to the lower end of the cylinder F. The piston in this cylinder at the end of its downward stroke moves the valve-stem S of the casing $r'$, placing in the manner described the conduit $q'$ into communication with the conduit $q^2$, so that the pressure fluid flows freely into the chamber $R^2$ of the casing $r$ on the cylinder E, and the valve-stem S of this casing being moved by the inward stroke of the piston in the cylinder in turn places the conduit $q^2$ in communication with the conduit $q^3$ and through it with the lower port of the cylinder $P'$. On the other hand, the movement of each of the pistons away from the outer heads of the cylinders E and $e$ and of the cylinder F permits the valves in the casings R, R, and R' to close, opening the exhaust from each casing and permitting through the casing R, attached to the outer head of the cylinder E, the exhaust of any pressure fluid which may be in the cylinder $P^2$, while at the same time the closing of the valve $S^3$ in the casing R, attached to the outer head of the cylinder $e$, cuts off all communication between the supply-pipe Q and the pipe $Q'$. It will be understood, of course, that the reversal of the movements of the various controlling-pistons will open the other of the two conduits and permit the first to exhaust, and obviously if any one of the pistons does not make its full motion, but stops at a point intermediate of the full extent of its stroke, it will not act on either of the valve-rods connected with the heads of the cylinder, and the pressure fluid from the supply-pipes Q and $q$ cannot find its way to either of the cylinders $P'$ or $P^2$, both of which will be open to the exhaust through the two valve-casings attached to the cylinder, the piston in which has not made its complete movement.

Returning now to the diagram Fig. 16 and supposing the switch to have been just turned to the position indicated in said figure, the battery-current will, as already described, pass through the circuit connections to the magnet $j^6$ and on the return-line through the signal O, lighting a lamp, as indicated, if a lamp is used for a signal. The energizing of the magnet $j^6$ will in the manner already described cause pressure fluid to be admitted from the chamber I' and ports $H^2$ to the left-hand side of the piston H', as shown in Fig. 10, and the resulting motion of said piston will move the controlling-valve $G^7$ $G^8$ to the right, admitting pressure fluid to the supply-pipe $E^6$ and permitting it to exhaust from the supply-pipe $E^7$. From the supply-pipe $E^6$ the pressure fluid is admitted to the outer ends of the cylinders E and $e$ and the upper end of the cylinder F, tending to raise the switches to the position indicated in Fig. 1 and to open the gate in the main tube A. As the pistons in the cylinders E and $e$ and F move outward they permit the valves to close in the casings R, R, and R', permitting any pressure fluid beneath the piston $P^4$ to exhaust and said piston to move down, carrying with it the switch-lever $P^9$ until it makes contact with the springs $P^{12}$. The further movement of the pistons E', E', and F' brings them in contact with the valve-rods projecting into the inner and lower heads of the cylinders, thereby raising the connected valves, as described, and in case all the pistons move as desired, permitting the pressure fluid from the supply-pipe $q$ to flow into the cylinder P', raising the piston $P^3$ and through it the switch-lever $P^8$, breaking contact with the springs $P^{11}$ and opening the circuit leading to the electromagnet $j^6$, with the result of cutting off the free supply of motive fluid to the left-hand end of the cylinder H and also of opening the circuit leading to the signal O, which by reason of the breaking of the circuit in the plan shown, by the cutting out of the lamp, gives notice to the operator that all the parts of the system have attained the desired position. The reverse movement of the switch of course reverses the action through the different parts described, effecting precisely the same sequence of acts in the opposite direction.

Having now described my invention, what I claim as new, and desire to secure by Letters Patent, is—

1. In a pneumatic transmission system the combination of a series of devices for governing the motion of a carrier through the same with a series of separate actuating mechanisms for actuating the individual carrier-governing devices, a signal and means governed only by the motion of each and all of the entire system of separate actuating devices for operating said signal.

2. In a pneumatic transmission system the combination of a series of devices for governing the motion of a carrier through the same with a series of separate actuating mechanisms for actuating the individual carrier-governing devices, a governing device whereby an operator can simultaneously act upon each of the separate actuating mechanisms to regulate the passage of a carrier through the system, a signal and means governed only by the motion of each and all of the entire system of separate actuating devices for operating said signal.

3. In a pneumatic transmission system the combination with a main line of tubes and a loop extending from and to said line, of a gate arranged to close and open the main line intermediate of the ends of the loop, switches at the junction of the ends of the loop with the main line, separate means for shifting the positions of each of the switches and of the gate so as to include or exclude the loop from the system, a signal to indicate the condition of the tube-circuit and means for actuating said signal connected as described with each separate actuating device for the switches and gate and dependent for its capacity to actuate the signal on the movement of all said actuating devices.

4. In a pneumatic transmission system the combination with a main line of tubes and a loop extending from and to said line, of a gate arranged to close and open the main line intermediate of the ends of the loop, switches at the junction of the ends of the loop with the main line, separate cylinders as E, e and F for actuating each of said switches and the gate so as to exclude or include the loop from the system, two systems of pipes one leading to and connecting with one end of each cylinder and the other leading to and connecting with the other end of each of said cylinders, a valve-chamber connecting with each pipe system and with a source of fluid-pressure, a valve situated therein and arranged to alternately connect one pipe system with the source of pressure and the other with an exhaust, means for actuating said valve, a signal to indicate the condition of the tube-circuit and means for actuating said signal connected as described with each separate actuating device for the switches and gate and dependent for its capacity to actuate the signal on the movement of all said actuating devices.

5. In a pneumatic transmission system the combination with a main line of tubes and a loop extending from and to said line, of a gate arranged to open and close the main line intermediate of the ends of the loop with the main line, separate means for shifting the positions of each of the switches and of the gate so as to include or exclude the loop from the system, means for simultaneously transmitting motive power to each of the independent actuating devices to move them in alternately reverse directions, a signal to indicate the condition of the tube-circuit and means for actuating said signal connected as described with each separate actuating device for the switches and gate and dependent for its capacity to actuate the signal on the movement of all said actuating devices.

6. In a pneumatic transmission system the combination of a series of devices for governing the course of a carrier through the same with means for actuating said devices, a series of valves as R, one or more arranged in connection with each separate device governing the course of the carrier, and in manner as specified to be actuated by or in accordance with the shifting of said devices, a conduit or conduits leading through said valves and open only when all said valves are open, a source of fluid-pressure connected to one end of said conduit, a movable part connected to the other end of said conduit and a signal arranged to be actuated by said moving part.

7. In a pneumatic transmission system the combination of a series of devices for governing the course of a carrier through the same with a series of separate cylinders arranged to operate said devices, two conduits, one connecting to one end of each cylinder and the other to the other ends thereof, a common valve-chamber with which both conduits connect, a source of fluid-supply leading to said valve-chamber, a valve situated in said chamber and arranged to alternately connect each conduit to the source of fluid-pressure and the other to an exhaust, a series of valves R $r$ connected to the top and bottom of each cylinder so as to be actuated by the movement of the pistons therein, two conduits, one leading through each set of valves and open only when all the valves of its set are open, a source of fluid-pressure connected to one end of said conduits, movable parts as pistons $P^3 P^4$ connected with the other ends of said conduits, and a signal arranged to be actuated by said movable parts.

8. In a pneumatic transmission system a series of switches or other movable devices controlling the path of a carrier through the system, means for moving said devices located in close proximity thereto, a common actuating device for simultaneously acting on said means to effect a shift in the positions of the parts they control, an indicator arranged in connection with such common actuating device to show the designed shift in the position of the controlled parts, and a signal system arranged as described in connection with the shifting devices to show whether they have all made their designed movements.

9. In a pneumatic transmission system a series of switches or other movable devices controlling the path of a carrier through the system, means for moving said devices located in close proximity thereto, a movable common controlling device for simultaneously acting on said means to shift the position of the parts they control, electromagnetic means for actuating said controlling device, circuit-wires, a switch arranged in connection with said wires to close the circuits to actuate the electromagnetic devices and through them the controlling device as desired, a signal situated in and actuated by the circuit-wires aforesaid and means governed and actuated by the devices governing the path of the carrier as specified and whereby the circuit is opened when the desired shift in their position is made.

10. In a pneumatic transmission system a series of switches or other movable devices controlling the path of a carrier through the system, means for moving said devices located in close proximity thereto, a movable common controlling device as G for simultaneously acting on said means to shift the position of the parts they control, a cylinder H and piston H' for moving said controlling device, chambers as I I' connected to the opposite ends of said cylinder and each having a connection, as $K^4$, with a source of fluid-pressure, and a connection, as $I^6$ $I^5$, to exhaust, valves as $J^2$ $J^3$ moving together and arranged to alternatively open and close the said admission and exhaust ports, means holding said valves normally in position to close the admission-ports and open the exhaust-ports, two electromagnets, one arranged in connection with each set of valves and so as to open the admission and close the exhaust port when energized, electric circuits arranged as specified in connection with said electromagnets, and a switch in said circuits adapted to close the circuit through either magnet at will.

11. In a pneumatic transmission system a series of switches or other movable devices controlling the path of a carrier through the system, means for moving said devices located in close proximity thereto, a movable common controlling device as G for simultaneously acting on said means to shift the position of the parts they control, a cylinder H and piston H' for moving said controlling device, chambers as I I' connected to the opposite ends of said cylinder and each having a connection, as $K^4$, with a source of fluid-pressure and a connection as $I^6$ $I^5$ to exhaust, valves as $J^2$ $J^3$ moving together and arranged to alternatively open and close the said admission and exhaust ports, means holding said valves normally in position to close the admission-ports and open the exhaust-ports, two electromagnets, one arranged in connection with each set of valves and so as to open the admission and close the exhaust port when energized, electric circuits arranged as specified in connection with said electromagnets, a switch in said circuits adapted to close the circuit through either magnet at will, a signal arranged to lie always in the circuit branch opened by the switch and means for opening said circuit actuated by the shifting of the carrier-controlling mechanism.

12. In a pneumatic transmission system, substantially as specified, the combination with a series of independent cylinders arranged to actuate carrier-controlling mechanism, of a series of valve-casings as R $r$ having two chambers as $R^2$ $R^3$ and conduits leading from each chamber connecting said casings together in two sets and as a whole with a source of pressure fluid and an actuating device, valves as $S^3$ $S^4$ arranged to control the communication between the chambers $R^2$ and $R^3$ and the exhaust from chamber $R^3$ as described and valve-rods as S projecting into the cylinders and arranged to be moved by the piston moving therein.

13. In a pneumatic transmission system the combination with a cylinder arranged to actuate carrier-controlling mechanism, of a valve-casting, as R, having two chambers, as $R^2$ $R^3$, and conduits leading from each chamber, the one leading from chamber $R^2$ connecting with a source of fluid-pressure and the one leading from chamber $R^3$ with a device to be actuated by such pressure, valves as $S^3$ $S^4$ arranged to control the communication between the chambers $R^2$ $R^3$ and the exhaust from chamber $R^3$ as described and a valve-actuating rod, as S, projecting into the cylinder, and arranged to be moved by the piston in said cylinder.

BIRNEY C. BATCHELLER.

Witnesses:
CHAS. F. MYERS,
D. STEWART.